United States Patent

[11] 3,590,429

| [72] | Inventors | Wilhelm Bammert<br>Homberg;<br>Walter Wimmers, Krefeld, both of,<br>Germany |
|---|---|---|
| [21] | Appl. No. | 776,899 |
| [22] | Filed | Nov. 19, 1968 |
| [45] | Patented | July 6, 1971 |
| [73] | Assignee | Schloemann Aktiengesellschaft<br>Dusseldorf, Germany |
| [32] | Priority | Dec. 1, 1967 |
| [33] | | Germany |
| [31] | | P 17 29 345.7 |

[54] CASINGS FOR DOUBLE CONVEYOR WORMS FOR EXTRUDERS OF SYNTHETIC MATERIALS
6 Claims, 1 Drawing Fig.

[52] U.S. Cl..................................................... 18/12
[51] Int. Cl.................................................. B29f 3/08
[50] Field of Search........................................... 18/12 SP

[56] References Cited
UNITED STATES PATENTS

| 2,466,934 | 4/1949 | Dellenbarger.............. | 18/12 (SP) |
| 3,277,529 | 10/1966 | Linder........................ | 18/12 (SP) |

FOREIGN PATENTS

| 756,006 | 4/1967 | Canada ...................... | 18/12 SP |

Primary Examiner—William S. Lawson
Attorney—Holman & Stern

ABSTRACT: The wear-resisting lining may consist of an alloy having a basis of boron with additions of nickel and silicon, or a basis of nickel and cobalt.

PATENTED JUL 6 1971
3,590,429
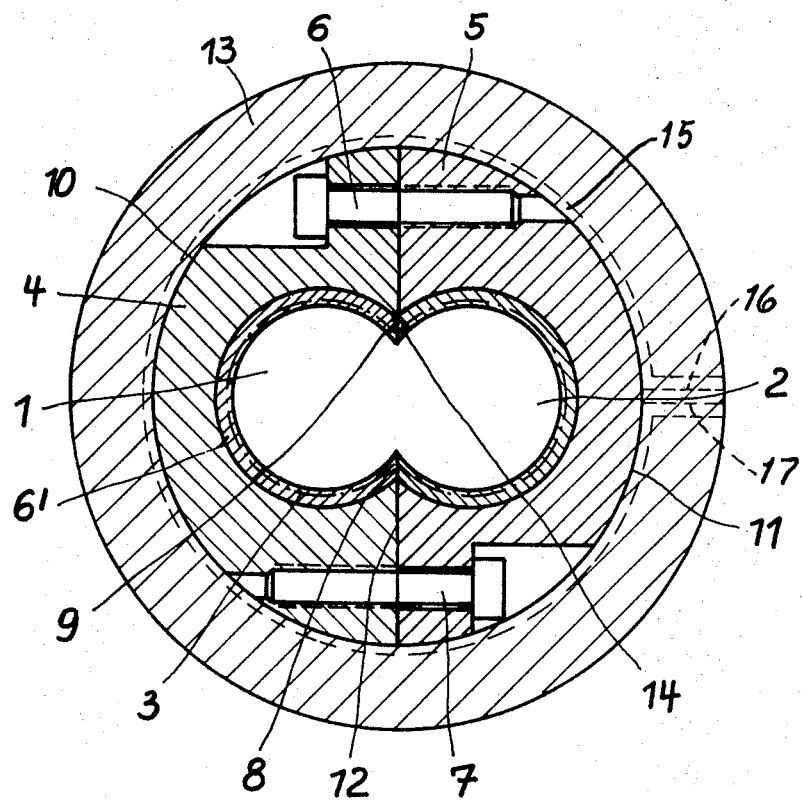
INVENTOR.
WILHELM BAMMERT
WALTER WIMMERS
BY Glascock, Downing
& Seebold
ATTORNEYS

CASINGS FOR DOUBLE CONVEYOR WORMS FOR EXTRUDERS OF SYNTHETIC MATERIALS

This invention relates to a casing for a double conveyor worm, provided with a wear-resisting internal coating, for extruders of synthetic materials, particularly thermoplastic materials, which is produced by uniting two internally coated and segmentally sectioned internally cylindrical casing members.

Known double-worm casings for thermoplastic extruders consist of a block in which are bored two cylinders intersecting in the form of a FIG. 8. Since, on the internal surfaces of these cylinders, in which the worms revolve, considerable requirements must be met as regards resistance to corrosion by corrosive synthetics, resistance to wear, operating characteristics and tolerances, as well as parallelism of the axes of the two cylinders, the nitriding steels usually inserted for this purpose are not adequate. It is known to produce wear-resistant internal coatings for single-worm casings on this ground by spraying the internal surface of the rotating casing. The spraying of a wear-resisting alloy on to the internal surface of a double-worm casing is indeed fundamentally also possible, but it leads to the feature that on the cutting edge of the two intersecting cylinders only a comparatively small thickness of coating can be obtained. On the intersecting edge of the internal coating, which has to separate the material conveyed by the two worms, considerable stresses occur, so that the usual coating operations, which in this region cannot ensure a sufficiently thick and accurate coating, are unsuitable. For this reason, saddle-shaped edge bars have been inserted in correspondingly shaped recesses extending longitudinally in the interior of the double-worm casing, and secured in the block by suitable means. The cost of production involved by this is however considerable, the accurately dimensioned insertion of the edge bars also being difficult.

In order to obviate these difficulties, it has also already been proposed to provide two tubular casing bodies each with an internal coating, and thereupon to machine them, thus removing from the two casing bodies sections extending in a longitudinal direction, and having segmental profiles. The casing bodies are then welded together in such a way that their two segmentally sectioned internal cylinders form the double-worm casing. By this means, however, it was not found possible to obtain a fluidtight joint, on account of the thermal expansions or stresses occurring during the welding, so that the thermoplastic material entering the joint represented a high permanent stress, and finally resulted in premature wear of the edges.

The object of the invention is to provide a double-worm casing having considerably more durable edges, so that the casing does not become useless after brief wear of the edges. With this in view, above all no synthetic material must be allowed to penetrate into the joint, since it would become considerably heated there, and would act as a nucleus for the decomposition of the material of the entire filling. According to the invention the two segmentally sectioned casing members or bodies are releasably connected with one another and are adjustable under stress. By this means, after the assembling of the casing members or bodies, not only is an accurate axial distance between the two cylinders ensured, but in addition the joint is likewise rendered completely fluidtight, so that no material can penetrate into it. In the event of some trifling wear, the arrangement can be released, so that the surfaces of the joint can be reground and then reassembled, thereby giving rise afresh to a completely sharp severing edge. In this case, if required, a built-up weld can be effected.

The internal coating may advantageously be applied centrifugally. A liquid alloy may very advantageously be sprayed on the internal surfaces of the rotating block. When employing an alloy on a basis of boron with nickel and silicon additions, or on the basis of nickel and cobalt, the liquid alloy that is to be sprayed on requires a temperature of about 800° C., while the internal cylindrical wall surface of the rotating block is preheated to about 600° c. The said alloys, known as xaloy, or as xaloy 306, here enter into a completely metallic combination with the carrier metal of the blocks. The requirements to be met by the coating are thus practically completely fulfilled by the material of this lining.

Further features of the invention are illustrated by way of example in the accompanying drawing, which relates to one embodiment.

The double-worm casing represented in cross section shows in the interior the two internal cylinders 1 and 2, in which the worm conveyors revolve. The The internal wall surfaces of the cylinders are coated with one of the said alloys, in such a way that an exactly uniform layer 3 is provided. Between the coating shrunk and the material of the carrier blocks or casing members 4 and 5 there may advantageously also be provided a sleeve 6' consisting of the steel C 45 N. The two blocks or casing members 4 and 5 are firmly connected with one another under stress by clamping screws 6 and 7. By this stress the result is obtained that the joints 8 and 9 close in a completely fluidtight manner.

It is furthermore an advantage to construct the peripheral surfaces 10 and 11 of the casing members or bodies 4 and 5, outside the section lines 12, with semicircular curvature, so that a ring 13, consisting of steel for instance, can be shrunk on, to hold the entire arrangement together under initial stress. The dimensions of the ring 13 and of the casing bodies 4 and 5 are here so selected that even when the double-worm casing is heated up to temperatures above 200° C., a sufficiently high initial stress is still ensured to guarantee a satisfactory sealing of the joint 12.

Apart from the embodiment illustrated in the drawing, the joint may alternatively be sealed in such a way that in the region of the joint there remains standing in one casing body a section 14 of the internal lining, while in the other casing body a corresponding recess is provided. The projecting section 14, when the cylinder is being assembled, enters the recess in the other casing body, and forms, after appropriate machining, grinding for instance, the actual cutting edge.

An adaptation of the double-worm casing to the requirements of a great variety of thermoplastic synthetics may be attained by providing, between the peripheral surfaces of the casing bodies 4 and 5 and the internal surface of the ring 13, ducts for heating or cooling media. Thus for instance encircling grooves 15, with inlet 16 and outlet 17 may be machined therein, through which heated oil or a cooling medium can flow.

We claim:

1. A casing for a double-worm conveyor for extruders of synthetic materials, particularly thermoplastic materials, comprising two internally cylindrical casing members with a segment of each cylindrical cavity removed, a wear-resisting lining in each of the two part-cylindrical cavities, and means for releasably uniting the two casing members, the uniting means being adjustable under stress.

2. A casing for a double-worm conveyor as claimed in claim 1, the means for releasably uniting the two casing members being clamping screws arranged on both sides of the cylindrical cavities.

3. The casing for a double-worm conveyor as claimed in claim 1, the peripheral surfaces of the casing members being of semicircular curvature, and the casing further comprising a steel ring shrunk on to the said semicircular surfaces.

4. The casing for a double-worm conveyor as claimed in claim 1, further comprising a steel sleeve interposed between the lining and the adjacent surface of the casing member body.

5. The casing for a double-worm conveyor as claimed in claim 3, in which groove means constituting ducts for the passage of tempering fluid are provided between the casing members and the shrunk-on ring.

6. The casing for a double-worm conveyor as claimed in claim 3, the internal peripheral surface of the shrunk-on ring being formed with grooves cooperating with the adjacent surfaces of the casing members to form ducts for the passage of tempering fluid.